A. KEHM.
HARROW.

No. 177,723.          Patented May 23, 1876.

Witnesses:
W. W. Lighter
J. K. Davis

Augustus Kehm
Inventor:
Per H. P. K. Peek
Attorney

UNITED STATES PATENT OFFICE.

AUGUSTUS KEHM, OF MIDDLETOWN, OHIO.

IMPROVEMENT IN HARROWS.

Specification forming part of Letters Patent No. 177,723, dated May 23, 1876; application filed May 12, 1876.

*To all whom it may concern:*

Be it known that I, AUGUSTUS KEHM, of Middletown, in the county of Butler and State of Ohio, have invented a new and useful Improvement in Harrows; and I do hereby declare that the following is a full and exact description thereof, reference being had to the accompanying drawings, and to the letters of reference marked thereon.

Figure 1:
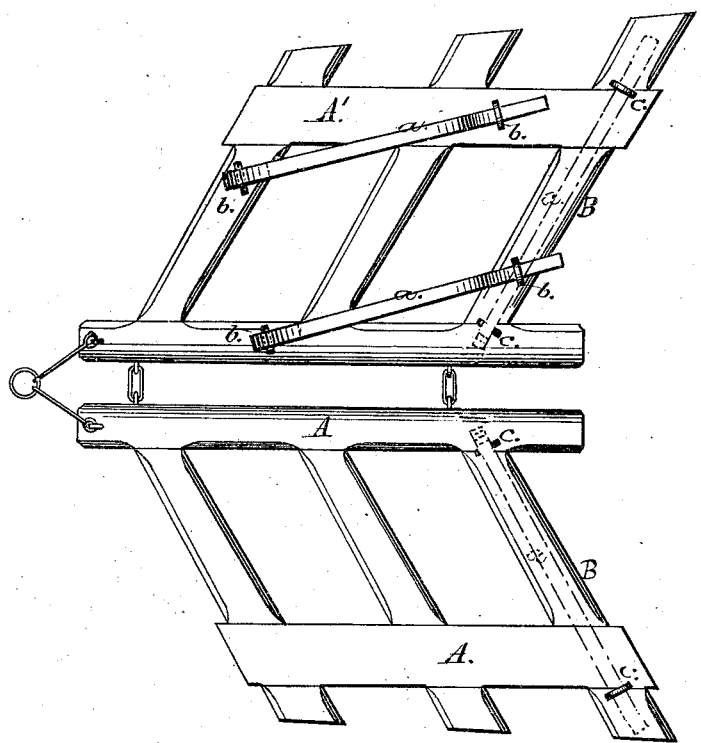
Figure 2:
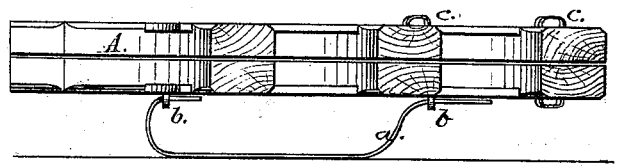

Figure 1 represents a plan or top view of my improved harrow. Fig. 2 represents the two sections of the harrow folded together and resting upon its runners.

The principal feature of my improved harrow consists in the use of convertible runners, so as to be capable of serving as handles.

In the accompanying drawings, A A' denote the frames, through which harrow-teeth will be inserted in the usual manner. The two sections of the frame are hinged together, so as to be capable of folding, as represented in Fig. 2. The frame A' is provided with four flat staples, b, which are inserted so as to leave loops, in which the ends of the runners can be placed to secure them. The runners a are made of flat bars of iron, so bent as that both ends point in the same direction, and form seats, upon which the harrow will rest when folded together for transportation. Staples c are like the staples b, two of which are inserted in each of the rear frame-pieces B; and when the harrow is in use the runners a will be removed from staples b, where they serve as runners, and will be inserted within the staples c, to serve the function of handles, for tilting the harrow to pass obstructions, and for cleaning its teeth when necessary.

The staples or loops and the runners are so formed that the latter can be easily removed and inserted in the two positions in which they are designed for use, and when inserted they will retain their places, owing to their particular shape.

Having described my invention, I claim and desire to secure by Letters Patent—

The folding harrow A A', in combination with the convertible runners a, adapted for attachment to the harrow, as runners or handles, by the staples b or c, substantially as described.

Witness my hand this 2d day of February, 1875.

AUGUSTUS KEHM.

Witnesses:
H. P. K. PECK,
JOHN M. DAVIDSON.